US012102134B2

(12) United States Patent
Korus et al.

(10) Patent No.: US 12,102,134 B2
(45) Date of Patent: Oct. 1, 2024

(54) APPARATUS FOR AN AEROSOL GENERATING DEVICE

(71) Applicant: NICOVENTURES TRADING LIMITED, London (GB)

(72) Inventors: Anton Korus, London (GB); Patrick Moloney, London (GB)

(73) Assignee: NICOVENTURES TRADING LIMITED, London (GB)

( * ) Notice: Subject to any disclaimer, the term of this patent is extended or adjusted under 35 U.S.C. 154(b) by 622 days.

(21) Appl. No.: 17/250,739

(22) PCT Filed: Aug. 30, 2019

(86) PCT No.: PCT/EP2019/073259
§ 371 (c)(1),
(2) Date: Feb. 26, 2021

(87) PCT Pub. No.: WO2020/043900
PCT Pub. Date: Mar. 5, 2020

(65) Prior Publication Data
US 2021/0204612 A1 Jul. 8, 2021

(30) Foreign Application Priority Data
Aug. 31, 2018 (GB) ...................................... 1814199

(51) Int. Cl.
*A24F 40/57* (2020.01)
*A24F 40/465* (2020.01)
(Continued)

(52) U.S. Cl.
CPC ............ *A24F 40/57* (2020.01); *A24F 40/465* (2020.01); *A24F 40/51* (2020.01); *H05B 1/0297* (2013.01); *H05B 6/06* (2013.01); *H05B 6/108* (2013.01)

(58) Field of Classification Search
CPC ........ A24F 40/57; A24F 40/465; A24F 40/51; H05B 1/0297; H05B 6/06; H05B 6/108
(Continued)

(56) References Cited

U.S. PATENT DOCUMENTS 4,016,391 A * 4/1977 Kiuchi .................... H02M 1/06 363/54
4,025,912 A * 5/1977 Rice ...................... G01L 19/086 340/870.18
(Continued)

FOREIGN PATENT DOCUMENTS

JP H11-121154 A 4/1999
WO 2015177255 A1 11/2015
(Continued)

OTHER PUBLICATIONS

International Preliminary Report on Patentability from priority application No. PCT/EP2019/073259 mailed Dec. 18, 2018, all pages cited in its entirety.
(Continued)

*Primary Examiner* — Peter G Leigh
(74) *Attorney, Agent, or Firm* — BURR & FORMAN LLP

(57) ABSTRACT

Apparatus for an aerosol generating device includes an LC resonant circuit including an inductive element for inductively heating a susceptor arrangement to heat an aerosol generating material to thereby generate an aerosol. The apparatus includes a switching arrangement for enabling a varying current to be generated from a DC voltage supply and flow through the inductive element to cause inductive heating of the susceptor arrangement. The apparatus also includes a temperature determiner for, in use, determining a temperature of the susceptor arrangement based on a frequency that the LC resonant circuit is being operated at.

31 Claims, 5 Drawing Sheets

(51) Int. Cl.

| | |
|---|---|
| ***A24F 40/51*** | (2020.01) |
| ***H05B 1/02*** | (2006.01) |
| ***H05B 6/06*** | (2006.01) |
| ***H05B 6/10*** | (2006.01) |

(58) Field of Classification Search
USPC .......................................................... 131/329
See application file for complete search history.

(56) References Cited

U.S. PATENT DOCUMENTS

| | | | | |
|---|---|---|---|---|
| 2017/0055574 | A1 | 3/2017 | Kaufman et al. | |
| 2017/0055585 | A1* | 3/2017 | Fursa | H03F 3/2176 |
| 2017/0055587 | A1* | 3/2017 | Zinovik | A24F 40/465 |

FOREIGN PATENT DOCUMENTS

| | | | | |
|---|---|---|---|---|
| WO | WO-2017085242 | A1 * | 5/2017 | |
| WO | 2018073376 | A1 | 4/2018 | |
| WO | WO-2018096000 | A1 * | 5/2018 | A24F 40/465 |
| WO | 2018195335 | A1 | 10/2018 | |

OTHER PUBLICATIONS

International Search Report from priority application No. PCT/EP2019/073259, mailed Jan. 8, 2020, all pages cited in its entirety.
Japanese office action in corresponding application No. 2021510311, issued Jun. 20, 2022, all pages cited in its entirety.

* cited by examiner

APPARATUS FOR AN AEROSOL GENERATING DEVICE

CROSS-REFERENCE TO RELATED APPLICATIONS

The present application is a National Phase entry of PCT Application No. PCT/EP2019/073259, filed Aug. 30, 2019, which claims priority from GB Patent Application No. 1814199.4 filed Aug. 31, 2018, each of which is fully incorporated herein by reference.

TECHNICAL FIELD

The present disclosure relates to apparatus for an aerosol generating device, in particular, apparatus comprising a temperature determiner for determining a temperature of a susceptor arrangement.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present disclosure, there is provided apparatus for an aerosol generating device, the apparatus comprising: an LC resonant circuit comprising an inductive element for inductively heating a susceptor arrangement to heat an aerosol generating material to thereby generate an aerosol; a switching arrangement for enabling a varying current to be generated from a DC voltage supply and flow through the inductive element to cause inductive heating of the susceptor arrangement; and a temperature determiner for, in use, determining a temperature of the susceptor arrangement based on a frequency that the LC resonant circuit is being operated at.

The temperature determiner may be for, in use, determining a temperature of the susceptor arrangement based on, in addition to the frequency that the LC resonant circuit is being operated at, a DC current from the DC voltage supply.

The temperature determiner may be for, in use, determining a temperature of the susceptor arrangement based on, in addition to the frequency that the LC resonant circuit is being operated at and the DC current from the DC voltage supply, a DC voltage of the DC voltage supply.

The LC circuit may be a parallel LC circuit comprising a capacitive element arranged in parallel with the inductive element.

The temperature determiner may determine an effective grouped resistance of the inductive element and the susceptor arrangement from the frequency that the LC resonant circuit is being operated at, the DC current from the DC voltage supply and the DC voltage of the DC voltage supply, and determines the temperature of the susceptor arrangement based on the determined effective grouped resistance.

The temperature determiner may determine the temperature of the susceptor arrangement from a calibration of values of the effective grouped resistance of the inductive element and the susceptor arrangement and the temperature of the susceptor arrangement.

The calibration may be based on a polynomial equation, preferably a third order polynomial equation.

The temperature determiner may determine the effective grouped resistance r using the formula $$r = \frac{I_s}{V_s}\frac{1}{(2\pi f_0 C)^2}$$

where $V_s$ is the DC voltage and $I_s$ is the DC current, C is a capacitance of the LC resonant circuit, and $f_0$ is the frequency that the LC resonant circuit is being operated at.

The frequency that the LC resonant circuit is being operated at may be the resonant frequency of the LC resonant circuit.

The switching arrangement may be configured to switch between a first state and a second state, and the frequency at which the LC circuit is being operated may be determined from a determination of a frequency at which the switching arrangement switches between the first state and the second state.

The switching arrangement may comprise one or more transistors and the frequency at which the LC circuit is being operated may be determined by measuring a period at which one of the transistors switches between an on state and an off state.

The apparatus may comprise a frequency to voltage converter configured to output a voltage value indicative of the frequency at which the LC circuit is being operated.

The DC voltage and/or the DC current may be estimated values.

Values obtained for the DC voltage and/or DC current may be values measured by the apparatus.

The calibration of values between the effective grouped resistance and the temperature of the susceptor arrangement may be one of a plurality of calibrations between the effective grouped resistance and the temperature of the susceptor arrangement, and the temperature determiner may be configured to select one of the plurality of calibrations to use in determining the temperature of the susceptor from values of the effective grouped resistance.

The apparatus may comprise a temperature sensor configured to detect a temperature associated with the susceptor arrangement prior to heating by the inductive element, and the temperature determiner may use the temperature detected by the temperature sensor to select the calibration.

The temperature measured by the temperature sensor may be a temperature ambient to the aerosol generating device.

The aerosol provision device may comprise a chamber to receive the susceptor arrangement, for example a chamber to receive a consumable comprising the susceptor arrangement, and the temperature measured by the temperature sensor may be a temperature of the chamber.

The temperature determiner may be configured to: determine a value of the effective grouped resistance corresponding to the temperature detected by the temperature sensor, and select the calibration from the plurality of calibrations based on a comparison between the temperature detected by the temperature sensor and the temperature given by each of the plurality of calibrations using the value of the effective grouped resistance corresponding to the temperature detected by the temperature sensor.

Each calibration may be a calibration curve, or a polynomial equation, or a set of calibration values in a look-up table.

The temperature determiner may be configured to perform the selection of a calibration each time the aerosol generating device is powered on, or each time the aerosol generating device enters into an aerosol generating mode.

The switching arrangement may be configured to alternate between the first state and the second state in response to voltage oscillations within the resonant circuit which operate at a resonant frequency of the resonant circuit, and the varying current may be thereby maintained at the resonant frequency of the resonant circuit.

The switching arrangement may comprise a first transistor and a second transistor, wherein, when the switching arrangement is in the first state the first transistor is OFF and the second transistor is ON and when the switching arrangement is in the second state the first transistor is ON and the second transistor is OFF.

The first transistor and the second transistor may each comprise a first terminal for turning that transistor ON and OFF, a second terminal and a third terminal, and wherein the switching arrangement is configured such that first transistor is adapted to switch from ON to OFF when the voltage at the second terminal of the second transistor is equal to or below a switching threshold voltage of the first transistor.

The first transistor and the second transistor may each comprise a first terminal for turning that transistor ON and OFF, a second terminal and a third terminal, wherein the switching arrangement is configured such that second transistor is adapted to switch from ON to OFF when the voltage at the second terminal of the first transistor is equal to or below a switching threshold voltage of the second transistor.

The resonant circuit may further comprise a first diode and a second diode and the first terminal of the first transistor may be connected to the second terminal of the second transistor via the first diode, and the first terminal of the second transistor may be connected to the second terminal of the first transistor via the second diode, whereby the first terminal of the first transistor is clamped at low voltage when the second transistor is ON and the first terminal of the second transistor is clamped at low voltage when the first transistor is ON.

The switching arrangement may be configured such that first transistor is adapted to switch from ON to OFF when the voltage at the second terminal of the second transistor is equal to or below a switching threshold voltage of the first transistor plus a bias voltage of the first diode.

The switching arrangement may be configured such that second transistor is adapted to switch from ON to OFF when the voltage at the second terminal of the first transistor is equal to or below a switching threshold voltage of the second transistor plus a bias voltage of the second diode.

A first terminal of the DC voltage supply may be connected to first and second points in the resonant circuit wherein the first point and the second point are electrically located to either side of the inductive element.

The apparatus may comprise at least one choke inductor positioned between the DC voltage supply and the inductive element.

According to a second aspect of the invention there is provided an aerosol generating device comprising the apparatus according to the first aspect.

DETAILED DESCRIPTION OF THE DRAWINGS

Figure 1:
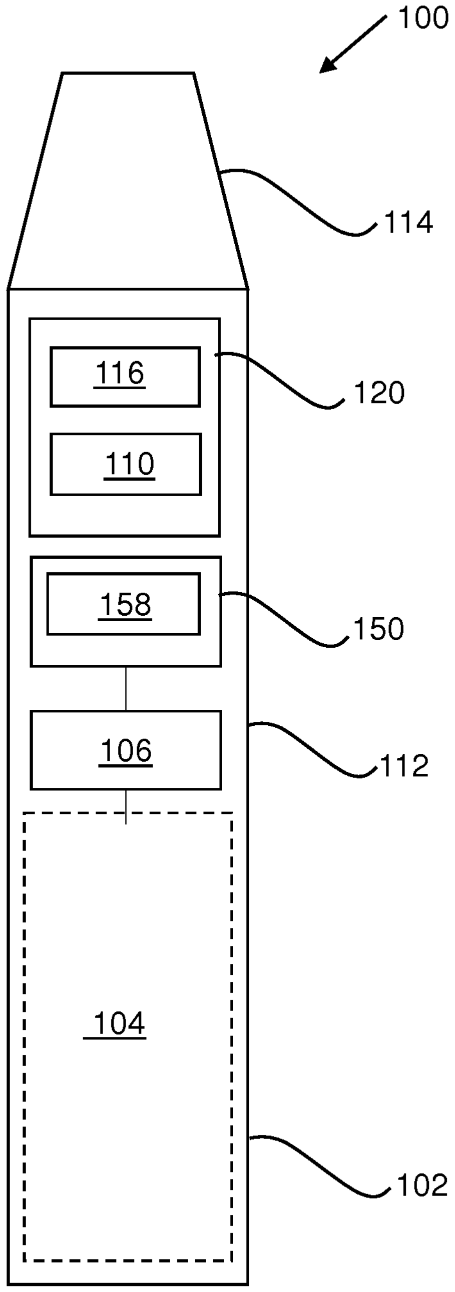
FIG. 1 illustrates schematically an aerosol generating device according to an example.

Induction heating is a process of heating an electrically conducting object (or susceptor) by electromagnetic induction. An induction heater may comprise an inductive element, for example, an inductive coil and a device for passing a varying electric current, such as an alternating electric current, through the inductive element. The varying electric current in the inductive element produces a varying magnetic field. The varying magnetic field penetrates a susceptor suitably positioned with respect to the inductive element, generating eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an LC circuit, having an inductance L provided by an induction element, for example the electromagnet which may be arranged to inductively heat a susceptor, and a capacitance C provided by a capacitor. The circuit may in some cases be represented as an RLC circuit, comprising a resistance R provided by a resistor. In some cases, resistance is provided by the ohmic resistance of parts of the circuit connecting the inductor and the capacitor, and hence the circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other.

One example of a circuit exhibiting electrical resonance is an LC circuit, comprising an inductor, a capacitor, and optionally a resistor. One example of an LC circuit is a series circuit where the inductor and capacitor are connected in series. Another example of an LC circuit is a parallel LC circuit where the inductor and capacitor are connected in parallel. Resonance occurs in an LC circuit because the collapsing magnetic field of the inductor generates an electric current in its windings that charges the capacitor, while the discharging capacitor provides an electric current that builds the magnetic field in the inductor. The present disclosure focuses on parallel LC circuits. When a parallel LC circuit is driven at the resonant frequency, the dynamic impedance of the circuit is at a maximum (as the reactance of the inductor equals the reactance of the capacitor), and circuit current is at a minimum. However, for a parallel LC circuit, the parallel inductor and capacitor loop acts as a current multiplier (effectively multiplying the current within the loop and thus the current passing through the inductor). Driving the RLC or LC circuit at or near the resonant frequency may therefore provide for effective and/or efficient inductive heating by providing for the greatest value of the magnetic field penetrating the susceptor.

A transistor is a semiconductor device for switching electronic signals. A transistor typically comprises at least three terminals for connection to an electronic circuit. In some prior art examples, an alternating current may be supplied to a circuit using a transistor by supplying a drive signal which causes the transistor to switch at a predetermined frequency, for example at the resonant frequency of the circuit.

A field effect transistor (FET) is a transistor in which the effect of an applied electric field may be used to vary the effective conductance of the transistor. The field effect transistor may comprise a body B, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be OFF (i.e. substantially prevent current from passing therethrough) when there is substantially zero gate G to source S voltage, and may be turned ON (i.e. substantially allow current to pass therethrough) when there is a substantially non-zero gate G-source S voltage.

An n-channel (or n-type) field effect transistor (n-FET) is a field effect transistor whose channel comprises an n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

A p-channel (or p-type) field effect transistor (p-FET) is a field effect transistor whose channel comprises a p-type semiconductor, where holes are the majority carriers and electrons are the minority carriers. For example, p-type semiconductors may comprise an intrinsic semiconductor (such as silicon for example) doped with acceptor impurities (such as boron for example). In p-channel FETs, the source terminal S is placed at a higher potential than the drain terminal D (i.e. there is a negative drain-source voltage, or in other words a positive source-drain voltage). In order to turn a p-channel FET "on" (i.e. to allow current to pass therethrough), a switching potential is applied to the gate terminal G that is lower than the potential at the source terminal S (and which may for example be higher than the potential at the drain terminal D).

A metal-oxide-semiconductor field effect transistor (MOSFET) is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor". However, in other examples, the gate may be made from other materials than metal, such as polysilicon, and/or the insulating layer may be made from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. As another example, a MOSFET may be a p-channel (or p-type) MOSFET, where the semiconductor is p-type. The p-channel MOSFET (p-MOSFET) may be operated in the same way as described above for the p-channel FET. An n-MOSFET typically has a lower source-drain resistance than that of a p-MOSFET. Hence in an "on" state (i.e. where current is passing therethrough), n-MOSFETs generate less heat as compared to p-MOSFETs, and hence may waste less energy in operation than p-MOSFETs. Further, n-MOSFETs typically have shorter switching times (i.e. a characteristic response time from changing the switching potential provided to the gate terminal G to the MOSFET changing whether or not current passes therethrough) as compared to p-MOSFETs. This can allow for higher switching rates and improved switching control.

FIG. 1 illustrates schematically an aerosol generating device 100, according to an example. The aerosol generating device 100 comprises a DC power source 104, in this example a battery 104, a circuit 150 comprising an inductive element 158, a susceptor arrangement 110, and aerosol generating material 116.

In the example of FIG. 1, the susceptor arrangement 110 is located within a consumable 120 along with the aerosol generating material 116. The DC power source 104 is electrically connected to the circuit 150 and is arranged to provide DC electrical power to the circuit 150. The device 100 also comprises control circuitry 106, in this example the circuit 150 is connected to the battery 104 via the control circuitry 106.

The control circuitry 106 may comprise means for switching the device 100 on and off, for example in response to a user input. The control circuitry 106 may for example comprise a puff detector (not shown), as is known per se, and/or may take user input via at least one button or touch control (not shown). The control circuitry 106 may comprise means for monitoring the temperature of components of the device 100 or components of a consumable 120 inserted in the device. In addition to the inductive element 158, the circuit 150 comprises other components which are described below.

The inductive element 158 may be, for example a coil, which may for example be planar. The inductive element 158 may, for example, be formed from copper (which has a relatively low resistivity). The circuitry 150 is arranged to convert an input DC current from the DC power source 104 into a varying, for example alternating, current through the inductive element 158. The circuitry 150 is arranged to drive the varying current through the inductive element 158.

The susceptor arrangement 110 is arranged relative to the inductive element 158 for inductive energy transfer from the inductive element 158 to the susceptor arrangement 110. The susceptor arrangement 110 may be formed from any suitable material that can be inductively heated, for example a metal or metal alloy, e.g., steel. In some implementations, the susceptor arrangement 110 may comprise or be entirely formed from a ferromagnetic material, which may comprise one or a combination of example metals such as iron, nickel and cobalt. In some implementations, the susceptor arrangement 110 may comprise or be formed entirely from a non-ferromagnetic material, for example aluminum. The inductive element 158, having varying current driven therethrough, causes the susceptor arrangement 110 to heat up by Joule heating and/or by magnetic hysteresis heating, as described above. The susceptor arrangement 110 is arranged to heat the aerosol generating material 116, for example by conduction, convection, and/or radiation heating, to generate an aerosol in use. In some examples, the susceptor arrangement 110 and the aerosol generating material 116 form an integral unit that may be inserted and/or removed from the aerosol generating device 100, and may be disposable. In some examples, the inductive element 158 may be removable from the device 100, for example for replacement. The aerosol generating device 100 may be hand-held. The aerosol generating device 100 may be arranged to heat the aerosol generating material 116 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 100 comprises an outer body 112 housing the DC power supply 104, the control circuitry 106 and the circuit 150 comprising the inductive element 158. The consumable 120 comprising the susceptor arrangement 110 and the aerosol generating material 116 in this example is also inserted into the body 112 to configure the device 100 for use. The outer body 112 comprises a mouthpiece 114 to allow aerosol generated in use to exit the device 100.

In use, a user may activate, for example via a button (not shown) or a puff detector (not shown), the circuitry 106 to cause varying, e.g. alternating, current to be driven through the inductive element 108, thereby inductively heating the susceptor arrangement 110, which in turn heats the aerosol generating material 116, and causes the aerosol generating material 116 thereby to generate an aerosol. The aerosol is generated into air drawn into the device 100 from an air inlet (not shown), and is thereby carried to the mouthpiece 104, where the aerosol exits the device 100 for inhalation by a user.

The circuit 150 comprising the inductive element 158, and the susceptor arrangement 110 and/or the device 100 as a whole may be arranged to heat the aerosol generating material 116 to a range of temperatures to volatilize at least one component of the aerosol generating material 116 without combusting the aerosol generating material. For example, the temperature range may be about 50° C. to about 350° C., such as between about 50° C. and about 300° C., between about 100° C. and about 300° C., between about 150° C. and about 300° C., between about 100° C. and about 200° C., between about 200° C. and about 300° C., or between about 150° C. and about 250° C. In some examples, the temperature range is between about 170° C. and about 250° C. In some examples, the temperature range may be other than this range, and the upper limit of the temperature range may be greater than 300° C.

It will be appreciated that there may be a difference between the temperature of the susceptor arrangement 110 and the temperature of the aerosol generating material 116, for example during heating up of the susceptor arrangement 110, for example where the rate of heating is large. It will therefore be appreciated that in some examples the temperature at which the susceptor arrangement 110 is heated to may, for example, be higher than the temperature to which it is desired that the aerosol generating material 116 is heated.

Figure 2:
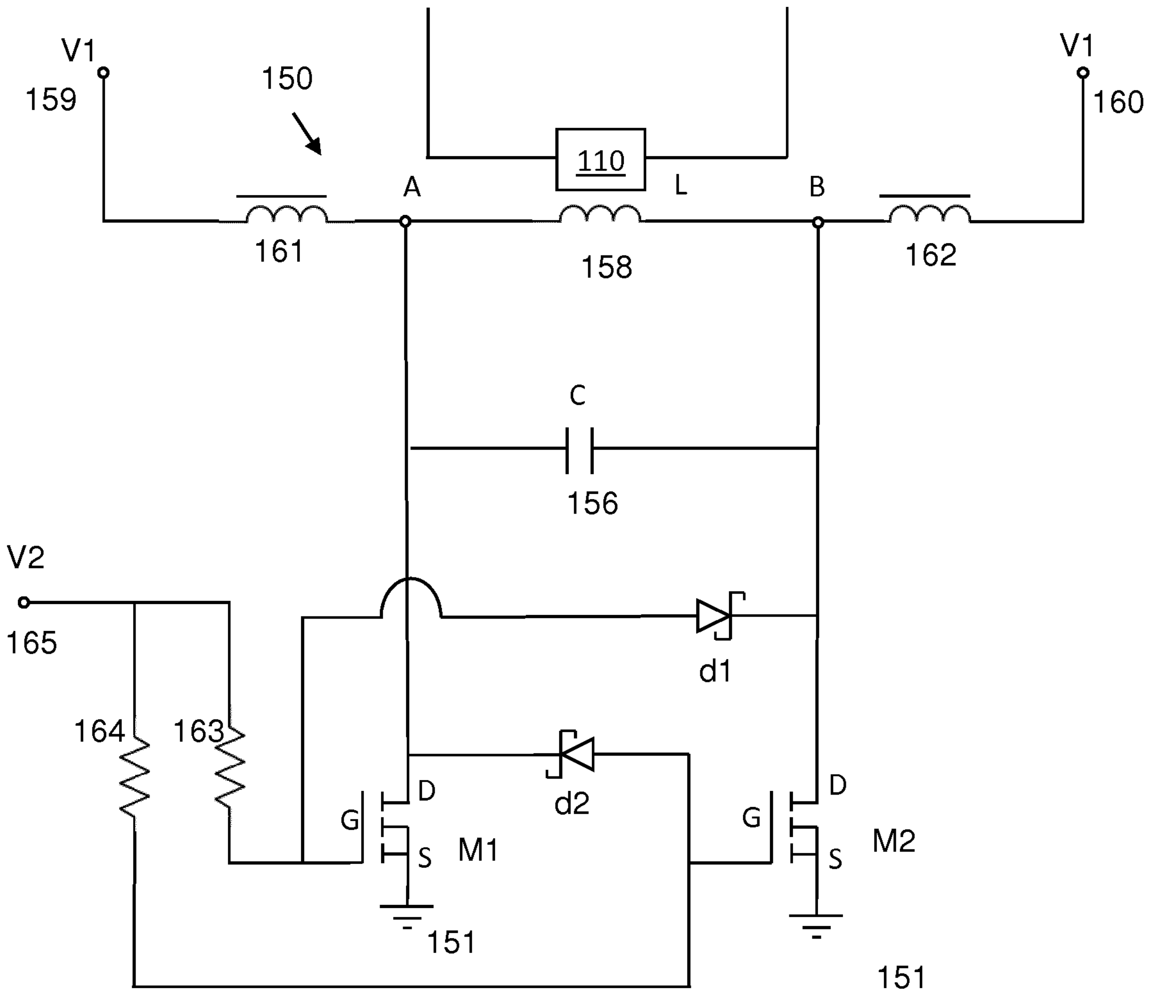
FIG. 2 illustrates schematically a resonant circuit according to an example.

Referring now to FIG. 2, there is illustrated an example circuit 150, which is a resonant circuit, for inductive heating of the susceptor arrangement 110. The resonant circuit 150 comprises the inductive element 158 and a capacitor 156, connected in parallel.

The resonant circuit 150 comprises a switching arrangement M1, M2 which, in this example, comprises a first transistor M1 and a second transistor M2. The first transistor M1 and the second transistor M2 each comprise a first terminal G, a second terminal D and a third terminal S. The second terminals D of the first transistor M1 and the second transistor M2 are connected to either side of the parallel inductive element 158 and the capacitor 156 combination, as will be explained in more detail below. The third terminals S of the first transistor M1 and the second transistor M2 are each connected to earth 151. In the example illustrated in FIG. 2 the first transistor M1 and the second transistor M2 are both MOSFETS and the first terminals G are gate terminals, the second terminals D are drain terminals and the third terminals S are source terminals.

It will be appreciated that in alternative examples other types of transistors may be used in place of the MOSFETs described above.

The resonance circuit 150 has an inductance L and a capacitance C. The inductance L of the resonant circuit 150 is provided by the inductive element 158, and may also be affected by an inductance of the susceptor arrangement 110 which is arranged for inductive heating by the inductive element 158. The inductive heating of the susceptor arrangement 110 is via a varying magnetic field generated by the inductive element 158, which, in the manner described above, induces Joule heating and/or magnetic hysteresis losses in the susceptor arrangement 110. A portion of the inductance L of the resonant circuit 150 may be due to the magnetic permeability of the susceptor arrangement 110. The varying magnetic field generated by the inductive element 158 is generated by a varying, for example alternating, current flowing through the inductive element 158.

The inductive element 158 may, for example, be in the form of a coiled conductive element. For example, inductive element 158 may be a copper coil. The inductive element 158 may comprise, for example, multi-stranded wire, such as Litz wire, for example a wire comprising a number of individually insulated wires twisted together. The AC resistance of a multi-stranded wire is a function of frequency and the multi-stranded wire can be configured in such a way that the power absorption of the inductive element is reduced at a driving frequency. As another example, the inductive element 158 may be a coiled track on a printed circuit board, for example. Using a coiled track on a printed circuit board may be useful as it provides for a rigid and self-supporting track, with a cross section which obviates any requirement for multi-stranded wire (which may be expensive), which can be mass produced with a high reproducibility for low cost. Although one inductive element 158 is shown, it will be readily appreciated that there may be more than one inductive element 158 arranged for inductive heating of one or more susceptor arrangements 110.

The capacitance C of the resonant circuit 150 is provided by the capacitor 156. The capacitor 156 may be, for example, a Class 1 ceramic capacitor, for example a COG type capacitor. The total capacitance C may also comprise the stray capacitance of the resonant circuit 150; however, this is or can be made negligible compared with the capacitance provided by the capacitor 156.

The resistance of the resonant circuit 150 is not shown in FIG. 2 but it should be appreciated that a resistance of the circuit may be provided by the resistance of the track or wire connecting the components of the resonance circuit 150, the resistance of the inductor 158, and/or the resistance to current flowing through the resonance circuit 150 provided by the susceptor arrangement 110 arranged for energy transfer with the inductor 158. In some examples, one or more dedicated resistors (not shown) may be included in the resonant circuit 150

The resonant circuit 150 is supplied with a DC supply voltage V1 provided from the DC power source 104 (see FIG. 1), e.g. from a battery. A positive terminal of the DC voltage supply V1 is connected to the resonant circuit 150 at a first point 159 and at a second point 160. A negative terminal (not shown) of the DC voltage supply V1 is connected to earth 151 and hence, in this example, to the source terminals S of both the MOSFETs M1 and M2. In examples, the DC supply voltage V1 may be supplied to the resonant circuit directly from a battery or via an intermediary element.

The resonant circuit 150 may therefore be considered to be connected as an electrical bridge with the inductive element 158 and the capacitor 156 in parallel connected between the two arms of the bridge. The resonant circuit 150 acts to produce a switching effect, described below, which results in a varying, e.g. alternating, current being drawn through the inductive element 158, thus creating the alternating magnetic field and heating the susceptor arrangement 110.

The first point 159 is connected to a first node A located at a first side of the parallel combination of the inductive element 158 and the capacitor 156. The second point 160 is connected to a second node B, to a second side of the parallel combination of the inductive element 158 and the capacitor 156. A first choke inductor 161 is connected in series between the first point 159 and the first node A, and a second choke inductor 162 is connected in series between the second point 160 and the second node B. The first and second chokes 161 and 162 act to filter out AC frequencies from entering the circuit from the first point 159 and the second point 160 respectively but allow DC current to be drawn into and through the inductor 158. The chokes 161 and 162 allow the voltage at A and B to oscillate with little or no visible effects at the first point 159 or the second point 160.

In this particular example, the first MOSFET M1 and the second MOSFET M2 are n-channel enhancement mode MOSFETs. The drain terminal of the first MOSFET M1 is connected to the first node A via a conducting wire or the like, while the drain terminal of the second MOSFET M2 is connected to the second node B, via a conducting wire or the like. The source terminal of each MOSFET M1, M2 is connected to earth 151.

The resonant circuit 150 comprises a second voltage source V2, gate voltage supply (or sometimes referred to herein as a control voltage), with its positive terminal connected at a third point 165 which is used for supplying a voltage to the gate terminals G of the first and second MOSFETs M1 and M2. The control voltage V2 supplied at the third point 165 in this example is independent of the voltage V1 supplied at the first and second points 159, 160, which enables variation of voltage V1 without impacting the control voltage V2. A first pull-up resistor 163 is connected between the third point 165 and the gate terminal G of the first MOSFET M1. A second pull-up resistor 164 is connected between the third point 165 and the gate terminal G of the second MOSFET M2.

In other examples, a different type of transistor may be used, such as a different type of FET. It will be appreciated that the switching effect described below can be equally achieved for a different type of transistor which is capable of switching from an "on" state to an "off" state. The values and polarities of the supply voltages V1 and V2 may be chosen in conjunction with the properties of the transistor used, and the other components in the circuit. For example, the supply voltages may be chosen in dependence on whether an n-channel or p-channel transistor is used, or in dependence on the configuration in which the transistor is connected, or the difference in the potential difference applied across terminals of the transistor which results in the transistor being in either on or off.

The resonant circuit 150 further comprises a first diode d1 and a second diode d2, which in this example are Schottky diodes, but in other examples any other suitable type of diode may be used. The gate terminal G of the first MOSFET M1 is connected to the drain terminal D of the second MOSFET M2 via the first diode d1, with the forward direction of the first diode d1 being towards the drain D of the second MOSFET M2.

The gate terminal G of the second MOSFET M2 is connected to the drain D of the first second MOSFET M1 via the second diode d2, with the forward direction of the second diode d2 being towards the drain D of the first MOSFET M1. The first and second Schottky diodes d1 and d2 may have a diode threshold voltage of around 0.3V. In other examples, silicon diodes may be used having a diode threshold voltage of around 0.7V. In examples, the type of diode used is selected in conjunction with the gate threshold voltage, to allow desired switching of the MOSFETs M1 and M2. It will be appreciated that the type of diode and gate supply voltage V2 may also be chosen in conjunction with the values of pull-up resistors 163 and 164, as well as the other components of the resonant circuit 150.

The resonant circuit 150 supports a current through the inductive element 158 which is a varying current due to switching of the first and second MOSFETs M1 and M2. Since, in this example the MOSFETs M1 and M2 are enhancement mode MOSFETS, when a voltage applied at the gate terminal G of one of the MOSFETs is such that a gate-source voltage is higher than a predetermined threshold for that MOSFET, the MOSFET is turned to the ON state. Current may then flow from the drain terminal D to the source terminal S which is connected to ground 151. The series resistance of the MOSFET in this ON state is negligible for the purposes of the operation of the circuit, and the drain terminal D can be considered to be at ground potential when the MOSFET is in the ON state. The gate-source threshold for the MOSFET may be any suitable value for the resonant circuit 150 and it will be appreciated that the magnitude of the voltage V2 and resistances of resistors 164 and 163 are chosen dependent on the gate-source threshold voltage of the MOSFETs M1 and M2, essentially so that voltage V2 is greater than the gate threshold voltage(s).

The switching procedure of the resonant circuit 150 which results in varying current flowing through the inductive element 158 will now be described starting from a condition where the voltage at first node A is high and the voltage at the second node B is low.

When the voltage at node A is high, the voltage at the drain terminal D of the first MOSFET M1 is also high because the drain terminal of M1 is connected, directly in this example, to the node A via a conducting wire. At the same time, the voltage at the node B is held low and the voltage at the drain terminal D of the second MOSFET M2 is correspondingly low (the drain terminal of M2 being, in this example, directly connected to the node B via a conducting wire).

Accordingly, at this time, the value of the drain voltage of M1 is high and is greater than the gate voltage of M2. The second diode d2 is therefore reverse-biased at this time. The gate voltage of M2 at this time is greater than the source terminal voltage of M2, and the voltage V2 is such that the gate-source voltage at M2 is greater than the ON threshold for the MOSFET M2. M2 is therefore ON at this time.

At the same time, the drain voltage of M2 is low, and the first diode d1 is forward biased due to the gate voltage supply V2 to the gate terminal of M1. The gate terminal of M1 is therefore connected via the forward biased first diode d1 to the low voltage drain terminal of the second MOSFET M2, and the gate voltage of M1 is therefore also low. In other words, because M2 is on, it is acting as a ground clamp, which results in the first diode d1 being forward biased, and the gate voltage of M1 being low. As such, the gate-source voltage of M1 is below the ON threshold and the first MOSFET M1 is OFF.

In summary, at this point the circuit 150 is in a first state, wherein:

voltage at node A is high;
voltage at node B is low;
first diode d1 is forward biased;
second MOSFET M2 is ON;
second diode d2 is reverse biased; and
first MOSFET M1 is OFF.

From this point, with the second MOSFET M2 being in the ON state, and the first MOSFET M1 being in the OFF state, current is drawn from the supply V1 through the first choke 161 and through the inductive element 158. Due to the presence of inducting choke 161, the voltage at node A is free to oscillate. Since the inductive element 158 is in parallel with the capacitor 156, the observed voltage at node A follows that of a half sinusoidal voltage profile. The frequency of the observed voltage at node A is equal to the resonant frequency $f_0$ of the circuit 150.

The voltage at node A reduces sinusoidally in time from its maximum value towards 0 as a result of the energy decay at node A. The voltage at node B is held low (because MOSFET M2 is on) and the inductor L is charged from the DC supply V1. The MOSFET M2 is switched off at a point in time when the voltage at node A is equal to or below the gate threshold voltage of M2 plus the forward bias voltage of d2. When the voltage at node A has finally reached zero, the MOSFET M2 will be fully off.

At the same time, or shortly after, the voltage at node B is taken high. This happens due to the resonant transfer of energy between the inductive element 158 and the capacitor 156. When the voltage at node B becomes high due to this resonant transfer of energy, the situation described above with respect to the nodes A and B and the MOSFETs M1 and M2 is reversed. That is, as the voltage at A reduces towards zero, the drain voltage of M1 is reduced. The drain voltage of M1 reduces to a point where the second diode d2 is no longer reverse biased and becomes forward biased. Similarly, the voltage at node B rises to its maximum and the first diode d1 switches from being forward biased to being reverse biased. As this happens, the gate voltage of M1 is no longer coupled to the drain voltage of M2 and the gate voltage of M1 therefore becomes high, under the application of gate supply voltage V2. The first MOSFET M1 is therefore switched to the ON state, since its gate-source voltage is now above the threshold for switch-on. As the gate terminal of M2 is now connected via the forward biased second diode d2 to the low voltage drain terminal of M1, the gate voltage of M2 is low. M2 is therefore switched to the OFF state.

In summary, at this point the circuit 150 is in a second state, wherein:

voltage at node A is low;
voltage at node B is high;
first diode d1 is reverse biased;
second MOSFET M2 is OFF;
second diode d2 is forward biased; and
first MOSFET M1 is ON.

At this point, current is drawn through the inductive element 158 from the supply voltage V1 through the second choke 162. The direction of the current has therefore reversed due to the switching operation of the resonant circuit 150. The resonant circuit 150 will continue to switch between the above-described first state in which the first MOSFET M1 is OFF and the second MOSFET M2 is ON, and the above-described second state in which the first MOSFET M1 is ON and the second MOSFET M2 is OFF.

In the steady state of operation, energy is transferred between the electrostatic domain (i.e., in the capacitor 156) and the magnetic domain (i.e., the inductor 158), and vice versa.

The net switching effect is in response to the voltage oscillations in the resonant circuit 150 where we have an energy transfer between the electrostatic domain (i.e., in the capacitor 156) and the magnetic domain (i.e., the inductor 158), thus creating a time-varying current in the parallel LC circuitry, which varies at the resonant frequency of the resonant circuit 150. This is advantageous for energy transfer between the inductive element 158 and the susceptor arrangement 110 since the circuitry 150 operates at its optimal efficiency level and therefore achieves more efficient heating of the aerosol generating material 116 compared to circuitry operating off resonance. The described switching arrangement is advantageous as it allows the circuit 150 to drive itself at the resonant frequency under varying load conditions. What this means is that in the event that the properties of the circuitry 150 change (for example if the susceptor 110 is present or not, or if the temperature of the susceptor changes, or even physical movement of the susceptor element 110), the dynamic nature of the circuitry 150 continuously adapts its resonant point to transfer energy in an optimal fashion, thus meaning that the circuitry 150 is always driven at resonance. Moreover, the configuration of the circuit 150 is such that no external controller or the like is required to apply the control voltage signals to the gates of the MOSFETS to effect the switching.

In examples described above, with reference to FIG. 2, the gate terminals G are supplied with a gate voltage via a second power supply which is different to the power supply for the source voltage V1. However, in some examples, the gate terminals may be supplied with the same voltage supply as the source voltage V1. In such examples, the first point 159, second point 160 and third point 165 in the circuit 150 may, for example, be connected to the same power rail. In such examples, it will be appreciated that the properties of the components of the circuit must be chosen to allow the described switching action to take place. For example, the gate supply voltage and diode threshold voltages should be chosen such that the oscillations of the circuit trigger switching of the MOSFETs at the appropriate level. The provision of separate voltage values for the gate supply voltage V2 and the source voltage V1 allows for the source voltage V1 to be varied independently of the gate supply voltage V2 without affecting the operation of the switching mechanism of the circuit.

The resonant frequency $f_0$ of the circuit 150 may be in the MHz range, for example in the range 0.5 MHz to 4 MHz, for example in the range 2 MHz to 3 MHz. It will be appreciated that the resonant frequency $f_0$ of the resonant circuit 150 is dependent on the inductance L and capacitance C of the circuit 150, as set out above, which in turn is dependent on the inductive element 158, capacitor 156 and additionally the susceptor arrangement 110. As such, the resonant frequency $f_0$ of the circuit 150 can vary from implementation to implementation. For example, the frequency may be in the range 0.1 MHz to 4 MHz, or in the range of 0.5 MHz to 2 MHz, or in the range 0.3 MHz to 1.2 MHz. In other examples, the resonant frequency may be in a range different from those described above. Generally, the resonant frequency will depend on the characteristics of the circuitry, such as the electrical and/or physical properties of the components used, including the susceptor arrangement 110.

It will also be appreciated that the properties of the resonant circuit 150 may be selected based on other factors for a given susceptor arrangement 110. For example, in order to improve the transfer of energy from the inductive element 158 to the susceptor arrangement 110, it may be useful to select the skin depth (i.e. the depth from the surface of the susceptor arrangement 110 within which the current density falls by a factor of 1/e, which is at least a function of frequency) based on the material properties of the susceptor arrangement 110. The skin depth differs for different materials of susceptor arrangements 110, and reduces with increasing drive frequency. On the other hand, for example, in order to reduce the proportion of power supplied to the resonant circuit 150 and/or driving element 102 that is lost as heat within the electronics, it may be beneficial to have a circuit which drives itself at relatively lower frequencies. Since the drive frequency is equal to the resonant frequency in this example, the considerations here with respect to drive frequency are made with respect to obtaining the appropriate resonant frequency, for example by designing a susceptor arrangement 110 and/or using a capacitor 156 with a certain capacitance and an inductive element 158 with a certain inductance. In some examples, a compromise between these factors may therefore be chosen as appropriate and/or desired.

The resonant circuit 150 of FIG. 2 has a resonant frequency $f_0$ at which the current I is minimized and the dynamic impedance is maximized. The resonant circuit 150 drives itself at this resonant frequency and therefore the oscillating magnetic field generated by the inductor 158 is maximum, and the inductive heating of the susceptor arrangement 110 by the inductive element 158 is maximized.

In some examples, inductive heating of the susceptor arrangement 110 by the resonant circuit 150 may be controlled by controlling the supply voltage provided to the resonant circuit 150, which in turn may control the current flowing in the resonant circuit 150, and hence may control the energy transferred to the susceptor arrangement 110 by the resonant circuit 150, and hence the degree to which the susceptor arrangement 110 is heated. In other examples, it will be appreciated that the temperature of the susceptor arrangement 110 may be monitored and controlled by, for example, changing the voltage supply (e.g., by changing the magnitude of the voltage supplied or by changing the duty cycle of a pulse width modulated voltage signal) to the inductive element 158 depending on whether the susceptor arrangement 110 is to be heated to a greater or lesser degree.

As mentioned above, the inductance L of the resonant circuit 150 is provided by the inductive element 158 arranged for inductive heating of the susceptor arrangement 110. At least a portion of the inductance L of resonant circuit 150 is due to the magnetic permeability of the susceptor arrangement 110. The inductance L, and hence resonant frequency $f_0$ of the resonant circuit 150 may therefore depend on the specific susceptor(s) used and its positioning relative to the inductive element(s) 158, which may change from time to time. Further, the magnetic permeability of the susceptor arrangement 110 may vary with varying temperatures of the susceptor 110.

In examples described herein the susceptor arrangement 110 is contained within a consumable and is therefore replaceable. For example, the susceptor arrangement 110 may be disposable and for example integrated with the aerosol generating material 116 that it is arranged to heat. The resonant circuit 150 allows for the circuit to be driven at the resonance frequency, automatically accounting for differences in construction and/or material type between different susceptor arrangements 110, and/or differences in the placement of the susceptor arrangements 110 relative to the inductive element 158, as and when the susceptor arrangement 110 is replaced. Furthermore, the resonant circuit is configured to drive itself at resonance regardless of the specific inductive element 158, or indeed any component of the resonant circuit 150 used. This is particularly useful to accommodate for variations in manufacturing both in terms of the susceptor arrangement 110 but also with regards to the other components of the circuit 150. For example, the resonant circuit 150 allows the circuit to remain driving itself at the resonant frequency regardless of the use of different inductive elements 158 with different values of inductance, and/or differences in the placement of the inductive element 158 relative to the susceptor arrangement 110. The circuit 150 is also able to drive itself at resonance even if the components are replaced over the lifetime of the device.

Operation of the aerosol generating device 100 comprising resonant circuit 150, will now be described, according to an example. Before the device 100 is turned on, the device 100 may be in an 'off' state, i.e. no current flows in the resonant circuit 150. The device 150 is switched to an 'on' state, for example by a user turning the device 100 on. Upon switching on of the device 100 the resonant circuit 150 begins drawing current from the voltage supply 104, with the current through the inductive element 158 varying at the resonant frequency $f_0$. The device 100 may remain in the on state until a further input is received by the controller 106, for example until the user no longer pushes the button (not shown), or the puff detector (not shown) is no longer activated, or until a maximum heating duration has elapsed. The resonant circuit 150 being driven at the resonant frequency $f_0$ causes an alternating current I to flow in the resonant circuit 150 and the inductive element 158, and hence for the susceptor arrangement 110 to be inductively heated, for a given voltage. As the susceptor arrangement 110 is inductively heated, its temperature (and hence the temperature of the aerosol generating material 116) increases. In this example, the susceptor arrangement 110 (and aerosol generating material 116) is heated such that it reaches a steady temperature $T_{MAX}$. The temperature $T_{MAX}$ may be a temperature which is substantially at or above a temperature at which a substantial amount of aerosol is generated by the aerosol generating material 116. The temperature $T_{MAX}$ may be between around 200 and around 300° C. for example (although of course may be a different temperature depending on the material 116, susceptor arrangement 110, the arrangement of the overall device 100, and/or other requirements and/or conditions). The device 100 is therefore in a 'heating' state or mode, wherein the aerosol generating material 116 reaches a temperature at which aerosol is substantially being produced, or a substantial amount of aerosol is being produced. It should be appreciated that in most, if not all cases, as the temperature of the susceptor arrangement 110 changes, so too does the resonant frequency $f_0$ of the resonant circuit 150. This is because magnetic permeability of the susceptor arrangement 110 is a function of temperature and, as described above, the magnetic permeability of the susceptor arrangement 110 influences the coupling between the inductive element 158 and the susceptor arrangement 110, and hence the resonant frequency $f_0$ of the resonant circuit 150.

The present disclosure predominantly describes an LC parallel circuit arrangement. As mentioned above, for an LC parallel circuit at resonance, the impedance is maximum and the current is minimum. Note that the current being minimum generally refers to the current observed outside of the parallel LC loop, e.g., to the left of choke 161 or to the right of choke 162. Conversely, in a series LC circuit, current is at maximum and, generally speaking, a resistor is required to be inserted to limit the current to a safe value which can otherwise damage certain electrical components within the circuit. This generally reduces the efficiency of the circuit because energy is lost through the resistor. A parallel circuit operating at resonance does not require such restrictions.

In some examples, the susceptor arrangement 110 comprises or consists of aluminum. Aluminum is an example of a non-ferrous material and as such has a relative magnetic permeability close to one. What this means is that aluminum has a generally low degree of magnetization in response to an applied magnetic field. Hence, it has generally been considered difficult to inductively heat aluminum, particularly at low voltages such as those used in aerosol provision systems. It has also generally been found that driving circuitry at resonance frequency is advantageous as this provides optimum coupling between the inductive element 158 and susceptor arrangement 110. For aluminum, it is observed that a slight deviation from the resonant frequency causes a noticeable reduction in the inductive coupling between the susceptor arrangement 110 and the inductive element 158, and thus a noticeable reduction in the heating efficiency (in some cases to the extent where heating is no longer observed). As mentioned above, as the temperature of the susceptor arrangement 110 changes, so too does the resonant frequency of the circuit 150. Therefore, in the case where the susceptor arrangement 110 comprises or consists of a non-ferrous susceptor, such as aluminum, the resonant circuit 150 of the present disclosure is advantageous in that the circuitry is always driven at the resonant frequency (independent of any external control mechanism). This means that maximum inductive coupling and thus maximum heating efficiency is achieved at all times enabling aluminum to be efficiently heated. It has been found that a consumable including an aluminum susceptor can be heated efficiently when the consumable includes an aluminum wrap forming a closed electrical circuit and/or having a thickness of less than 50 microns.

In examples where the susceptor arrangement 110 forms part of a consumable, the consumable may take the form of that described in PCT/EP2016/070178, the entirety of which is incorporated herein by reference.

The device 100 is provided with a temperature determiner for, in use, determining a temperature of the susceptor arrangement 110. As is illustrated in FIG. 1, the temperature determiner may be the control circuitry 106, for example, a processor that controls the overall operation of the device 100. The temperature determiner 106 determines a temperature of the susceptor arrangement 110 based on a frequency that the resonant circuit 150 is being driven at, a DC current from the DC voltage supply V1 and a DC voltage of the DC voltage supply V1.

Without wishing to be bound by theory, the following description explains the derivation of relationships between electrical and physical properties of the resonant circuit 150 which allow the temperature of the susceptor arrangement 110 in examples described herein to be determined.

In use, the impedance at resonance of the parallel combination of the inductive element 158 and the capacitor 156 is the dynamic impedance $R_{dyn}$.

As explained above, the action of the switching arrangement M1 and M2 results in a DC current drawn from the DC voltage source V1 being converted into an alternating current that flows through the inductive element 158 and capacitor 156. An induced alternating voltage is also generated across the inductive element 158 and the capacitor 156.

As a result of the oscillatory nature of the resonant circuit 150, the impedance looking into the oscillatory circuit is $R_{dyn}$ for a given source voltage $V_s$ (of the voltage source V1). A current $I_s$ will be drawn in response to $R_{dyn}$. Therefore, the impedance of the load $R_{dyn}$ of the resonant circuit 150 may be equated with the impedance of the effective voltage and current draw. This allows the impedance of the load to be determined via determination, for example measuring values, of the DC voltage $V_s$ and the DC current $I_s$, as per equation (1) below.

$$R_{dyn} = \frac{V_s}{I_s} \quad (1)$$

At the resonant frequency $f_0$, the dynamic impedance $R_{dyn}$ is $$R_{dyn} = \frac{L}{Cr} \quad (2)$$

where the parameter r can be considered to represent the effective grouped resistance of the inductive element 158 and the influence of the susceptor arrangement 110 (when present), and, as described above, L is the inductance of the inductive element 158, and C is the capacitance of the capacitor 156. The parameter r is described herein as an effective grouped resistance. As will be appreciated from the description below, the parameter r has units of resistance (Ohms), but in certain circumstances may not be considered to represent a physical/real resistance of the circuit 150.

As described above, the inductance of the inductive element 158 here takes into the account the interaction of the inductive element 158 with the susceptor arrangement 110. As such, the inductance L depends on the properties of the susceptor arrangement 110 and position of the susceptor arrangement 110 relative to the inductive element 158. The inductance L of the inductive element 158 and hence of the resonant circuit 150 is dependent on, amongst other factors, the magnetic permeability μ of the susceptor arrangement 110. Magnetic permeability μ is a measure of the ability of a material to support the formation of a magnetic field within itself, and expresses the degree of magnetization that a material obtains in response to an applied magnetic field. The magnetic permeability μ of a material from which the susceptor arrangement 110 is comprised may change with temperature.

From equations (1) and (2) the following equation (3) can be obtained $$r = \frac{LI_s}{CV_s} \tag{3}$$

The relation of the resonant frequency $f_0$ to the inductance L and capacitance C can be modelled in at least two ways, given by equations (4a and 4b) below.

$$f_0 = \frac{1}{2\pi\sqrt{LC}} \tag{4a}$$

$$f_0 = \frac{1}{2\pi L}\sqrt{\frac{L}{C} - r^2} \tag{4b}$$

Equation (4a) represents the resonant frequency as modelled using a parallel LC circuit comprising an inductor L and a capacitor C, whereas Equation (4b) represents the resonant frequency as modelled using a parallel LC circuit with an additional resistor r in series with the inductor L. It should be appreciated for Equation (4b) that as r tends to zero, Equation (4b) tends to Equation (4a).

In the following, we assume that r is small and hence we can make use of Equation (4a). As will be described below, this approximation works well as it combines the changes within the circuit 150 (e.g., in inductance and temperature) within the representation of L. From equations (3) and (4a) the following expression can be obtained $$r = \frac{I_s}{V_s}\frac{1}{(2\pi f_0 C)^2} \tag{5}$$

It will be appreciated that Equation (5) provides an expression for the parameter r in terms of measurable or known quantities. It should be appreciated here that the parameter r is influenced by the inductive coupling in the resonant circuit 150. When loaded, i.e., when a susceptor arrangement is present, it may not be the case that we can consider the value of the parameter r to be small. In which case, the parameter r may no longer be an exact representation of the group resistances, but is instead a parameter which is influenced by the effective inductive coupling in the circuit 150. The parameter r is said to be a dynamic parameter, which is dependent on the properties of the susceptor arrangement 110, as well as the temperature T of the susceptor arrangement. The value of DC source $V_s$ is known (e.g. a battery voltage) or may be measured by a voltmeter and the value of the DC current $I_s$ drawn from the DC voltage source V1 may be measured by any suitable means, for example by use of a voltmeter appropriately placed to measure the source voltage $V_s$.

The frequency $f_0$ may be measured and/or determined to allow then the parameter r to be obtained.

In one example, the frequency $f_0$ may be measured via use of a frequency-to-voltage (F/V) converter 210. The F/V converter 210 may, for example, be coupled to a gate terminal of one of the first MOSFET M1 or the second MOSFET M2. In examples where other types of transistors are used in the switching mechanism of the circuit, the F/V converter 210 may be coupled to a gate terminal, or other terminal which provides a periodic voltage signal with frequency equal to the switching frequency of one of the transistors. The F/V converter 210 therefore may receive a signal from the gate terminal of one of the MOSFET M1, M2 representative of the resonance frequency $f_0$ of the resonant circuit 150. The signal received by the F/V converter 210 may be approximately a square-wave representation with a period representative of the resonant frequency of the resonant circuit 210. The F/V converter 210 may then use this period to represent the resonant frequency $f_0$ as an output voltage.

Accordingly, as C is known from the value of the capacitance of the capacitor 156, and $V_s$, $I_s$, and $f_0$ can be measured, for example as described above, the parameter r can be determined from these measured and known values.

The parameter r of the inductive element 158 changes as a function of temperature, and further as a function of the inductance L. This means that the parameter r has a first value when the resonant circuit 150 is in an "unloaded" state, i.e. when the inductive element 158 is not inductively coupled to the susceptor arrangement 110, and the value of r changes when the circuit moves into a "loaded" state, i.e. when the inductive element 158 and susceptor arrangement 110 are inductively coupled with each other.

In using the method described herein to determine the temperature of the susceptor arrangement 110, whether the circuit is in the "loaded" state, or the "unloaded" state is taken into account. For example, the value of the parameter r of the inductive element 158 in a particular configuration may be known and may be compared to a measured value to determine whether the circuit is "loaded" or "unloaded". In examples, whether the resonant circuit 150 is unloaded or loaded may be determined by control circuitry 106 detecting the insertion of a susceptor arrangement 110, for example detecting the insertion of a consumable containing a susceptor arrangement 110, into the device 100. The insertion of the susceptor arrangement 110 may be detected via any suitable means, such as an optical sensor or a capacitive sensor, for example. In other examples, the unloaded value of the parameter r may be known and stored in the control circuitry 106. In some examples, the susceptor arrangement 110 may comprise a part of the device 100 and so the resonant circuit 150 may continually be considered to be in the loaded state.

Once it is determined, or can be assumed, that the resonant circuit 150 is in the loaded state, with a susceptor arrangement 110 inductively coupled to the inductive element 158, a change in the parameter r can be assumed to be indicative of a change in temperature of the susceptor arrangement 110. For example, the change in r may be considered indicative of heating of the susceptor arrangement 110 by the inductive element 158.

The device 100 (or effectively the resonant circuit 150) may be calibrated to enable the temperature determiner 106 to determine the temperature of the susceptor arrangement 110 based on a measurement of the parameter r.

The calibration may be performed on the resonant circuit 150 itself (or on an identical test circuit used for calibration purposes) by measuring the temperature T of the susceptor arrangement 110 with a suitable temperature sensor such as a thermocouple, at multiple given values of the parameter r, and taking a plot of r against T.

Figure 3:
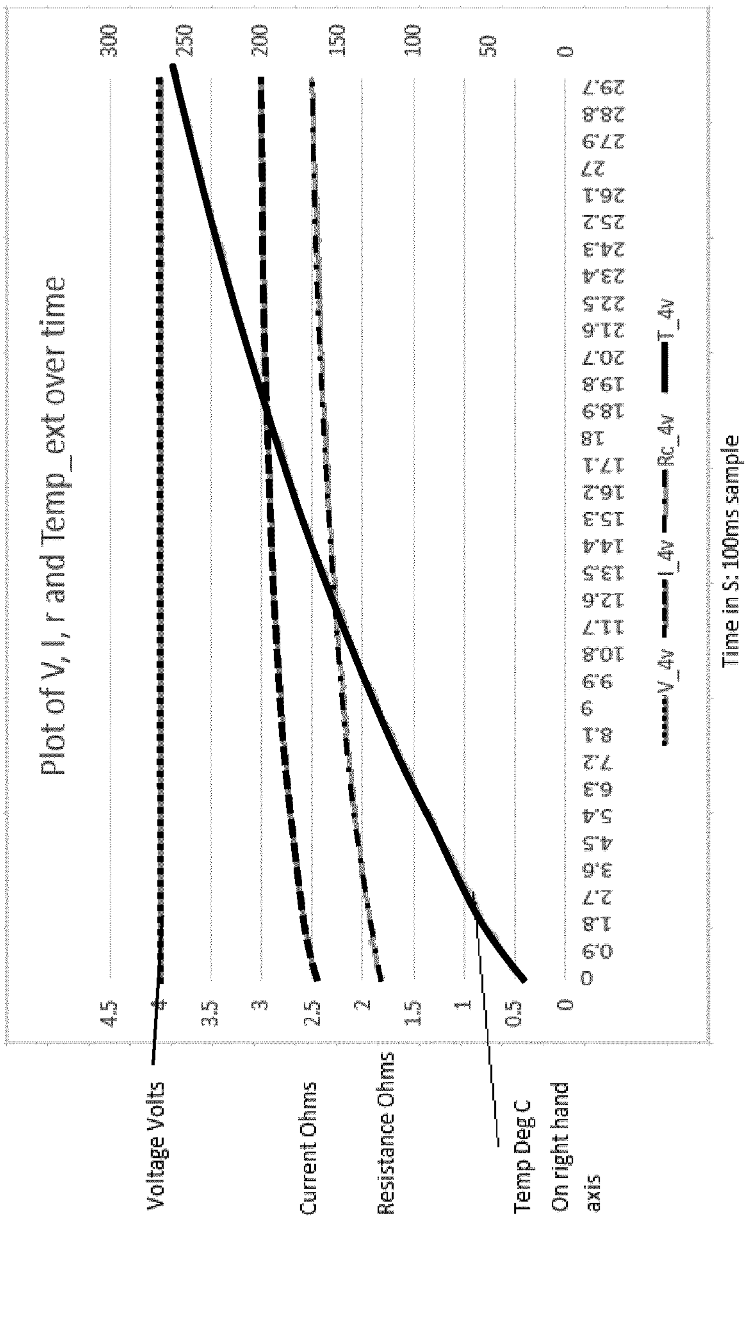
FIG. 3 shows plots of voltage, current, effective grouped resistance and susceptor arrangement temperature against time according to an example.

FIG. 3 shows an example of measured values of $V_s$, $I_s$, r and T shown on the y-axis against time t of operation of the resonant circuit 150 on the x-axis. It can be seen that at an essentially constant DC supply voltage $V_s$ of around 4V, over a time t of approximately 30 seconds, the DC current $I_s$ increases from around 2.5A to around 3A, and the parameter r increases from around 1.7-1.852 to around 2.552. At the same time, the temperature T increases from around 20-25° C. to around 250-260° C.

Figure 4:
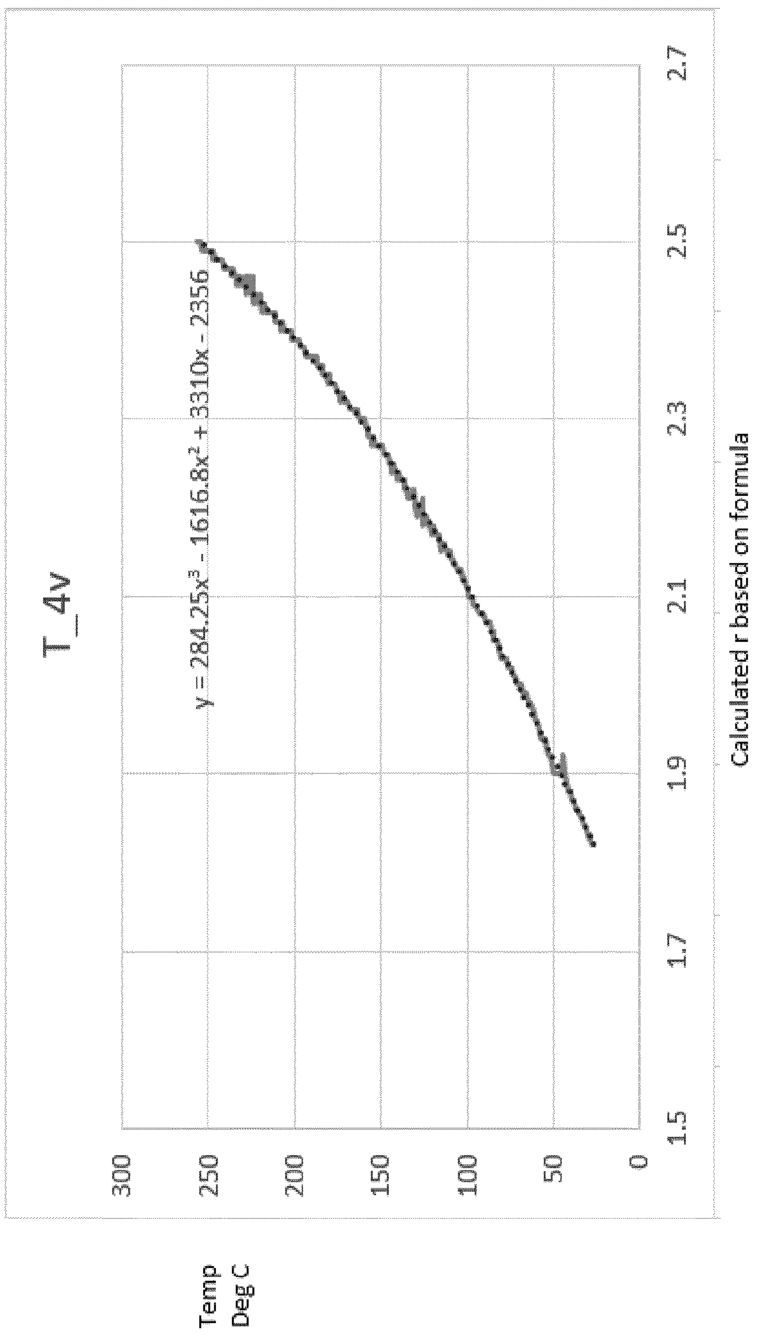
FIG. 4 shows a plot of susceptor arrangement temperature against parameter r according to an example.

FIG. 4 shows a calibration graph based on the values of r and T shown in FIG. 3 and described above. In FIG. 4, temperature T of the susceptor arrangement 110 is shown on the y-axis while the parameter r is shown on the x-axis. In the example of FIG. 4 a function has been fitted to the plot of T against r, which in this example is a third-order polynomial function. The function is fitted to the values of r that correspond to a change in temperature T. As mentioned above, the value of the parameter r may also change between an unloaded state (when no susceptor arrangement 110 is present) and a loaded state (when a susceptor arrangement 110 is present), although this is not shown in FIG. 4. Thus, the range of r chosen to be plotted for such a calibration may be selected so as to exclude any change in r due to changes in the circuit, e.g. changing to/from "loaded" and "unloaded" states. In other examples, other functions may be fit to the plot or an array of values for r and T may be stored in a look-up format, for example in a look-up table. Although as mentioned above that in a loaded state we may not consider that r is small, it has been found that the approximation of Equation 4a still enables an accurate track of the temperature. Without wishing to be bound by theory, it is thought that changes in the various electrical and magnetic parameters of the circuit are 'wrapped up' in the value of L of Equation 4a.

In use, the temperature determiner 106 receives values of the DC voltage $V_s$, the DC current $I_s$ and the frequency $f_0$ and determines a value of the parameter r in accordance with Equation 5 above. The temperature determiner determines a value for the temperature of the susceptor arrangement 110 using the calculated value of the parameter r, for example, by calculating the temperature using a function such as the one illustrated in FIG. 4, or performing a look up in a table of values for the parameter r and temperature T obtained by calibration as explained above.

In some examples, this may allow the control circuitry 106 to take an action based on a determined temperature of the susceptor 110. For example, the voltage supply may be switched off or lowered (either through lowering the voltage supplied or by lowering the average voltage supplied by altering a duty cycle if using a pulse width modulation scheme) if the determined susceptor temperature T is above a predetermined value.

In some examples, the method of determining temperature T from the parameter r may comprise assuming a relation between T and r, determining a change of r, and from the change of r determining a change in the temperature T.

FIG. 4 represents a single calibration curve which is representative of a certain susceptor arrangement 110 geometry, material type, and/or relative positioning to the inductive element 158. In some implementations, particularly for implementations where a broadly similar susceptor arrangement 110 is to be used in a device 100, a single calibration curve may be sufficient to account for e.g., manufacturing tolerances. In other words, the error in the temperature measurement (from the determined value of r) may be acceptable to account for various manufacturing tolerances of a single susceptor arrangement 110. Therefore, the control circuitry 106 is configured to perform the operations of determining a value of r followed by determining a value of the temperature T (e.g., using the polynomial curve or look-up table as above).

Figure 5:
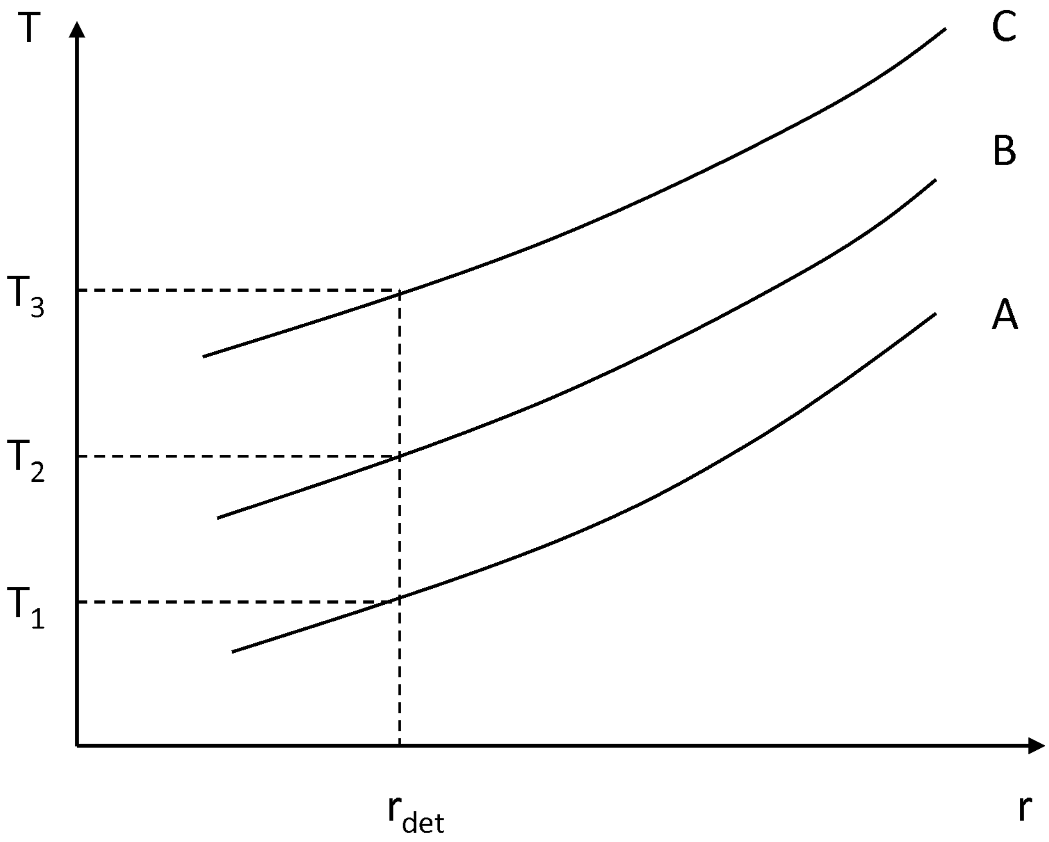
FIG. 5 shows a schematic representation of a plurality of plots of susceptor arrangement temperature against parameter r according to an example.

In other examples, and particularly those where a susceptor has a different shape and/or is formed of a different material, different calibration curves (e.g., different third order polynomials) may be required for these different susceptor arrangements 110. FIG. 5 shows a basic representation of a set of three calibration curves, each of which have an associated polynomial function (not shown) fitted thereto. As with FIG. 4, temperature T of the susceptor arrangement 110 is shown on the y-axis while the effective grouped resistance r is shown on the x-axis. Purely by way of example and for illustrative purposes only, curve A may be representative of a stainless steel susceptor, curve B may be representative of an iron susceptor, and curve C may be representative of an aluminum susceptor.

In aerosol generation devices 100 in which different susceptor arrangements 110 can be received and heated, the control circuitry 106 may further be configured to determine which of the calibration curves (e.g., to select from curves A, B or C of FIG. 5) is the correct curve to use for the inserted susceptor arrangement 110. In one example, the aerosol generation device 100 may be fitted with a temperature sensor (not shown) configured to measure a temperature associated with the device 100. In one implementation, the temperature sensor may be configured to detect the temperature of the environment surrounding the device 100 (i.e., the ambient temperature). This temperature may be representative of the temperature of the susceptor arrangement 110 immediately prior to insertion into the device 110, assuming that the susceptor arrangement is not warmed by any other means other than the immediate environment prior to insertion. In other examples, the temperature sensor may be configured to measure the temperature of a chamber configured to receive the consumable 120.

As broadly shown by FIG. 5, a value of r can be determined ($r_{det}$) based on Equation (5). $r_{det}$ is measured either as soon as the susceptor arrangement 110 is placed within the device 100 (if the inductive element 158 is currently active) or as soon as the inductive element 158 is activated (i.e., as soon as a current begins flowing in the circuit 150). That is, $r_{det}$ is preferably determined in the absence of any additional heating caused by energy transfer from the inductive element 158. As seen from FIG. 5, for a given $r_{det}$ there are a plurality of possible temperatures (T1, T2, and T3) each corresponding to a point on one of the calibration curves. In order to distinguish which of the calibration curves is the most appropriate to use for the susceptor arrangement 110 that is currently inserted into the device 100, the control circuitry 106 is configured to firstly determine a value of r (as described above). The control circuitry 106 is configured to obtain/receive a temperature measurement (or an indication of a temperature measurement) from the temperature sensor, and compare the temperature measurement with the temperature values corresponding to a determined r value for each of (or a subset of) the calibration curves. By way of example, and with reference to FIG. 5, if the temperature sensor senses a temperature t equal to T1, then the control circuitry compares the sensed temperature T to the three temperature values T1, T2, T3 corresponding to the determined r value for each calibration curve A, B, and C. Depending on the result of the comparison, the control circuitry sets the calibration curve having the temperature value closest to the measured/sensed temperature value as the calibration curve for that susceptor arrangement 110. In the above example, calibration curve A is set by the control circuitry 106 as the calibration curve for the inserted susceptor 110. Thereafter, each time a value of r is determined by the control circuitry 106, the temperature of the susceptor arrangement 110 is calculated based on the selected calibration curve (curve A). While it has been described above that the calibration curve is selected/set, it should be appreciated that this can mean either that the polynomial equation representing the curve is selected, or the set of calibration values corresponding to the curve, for example in a look-up table, may be selected.

In this regard, the comparison step described above may be implemented according to any suitable comparison algorithm. For example, suppose the sensed temperature t is between T1 and T2. The control circuitry 106 may select either of curve A or curve B depending on the algorithm used. The algorithm may select the curve having the smallest difference (that is, whichever of T2−t or t−T1 is smallest). Other algorithms, such as selecting the greatest value (in this case T2), may be implemented. The principles of the present disclosure are not limited to a particular algorithm in this regard.

In addition, the control circuitry 106 may be configured to repeat the process for determining the calibration curve in certain conditions. For example, each time the device is powered up, the control circuitry 106 may be configured to repeat the process of identifying the appropriate curve at the appropriate time (for instance when the inductive element 158 is first supplied with current). In this regard, the device 100 may have several modes of operation, such as an initial power on state, where power from the battery is supplied to the control circuitry 106 (but not to the resonant circuit 150). This state may be transition to through a user pushing a button on the surface of the device 100 for example. The device 100 may also have an aerosol generating mode where power is additionally supplied to the resonant circuit 150. This may be activated either through a button or a puff sensor (as described above). Hence, the control circuitry 106 may be configured to repeat the process for selecting the appropriate calibration curve when the aerosol generating mode is first selected. Alternatively, the control circuitry 106 may be configured to determine when a susceptor arrangement is removed (or inserted into) the device 100, and is configured to repeat the process for determining the calibration curve at the next appropriate opportunity.

While it has been described above that the control circuitry makes use of Equations 4a and 5, it should be appreciated that other equations achieving the same or similar effect may be used in accordance with the principles of the present disclosure. In one example, $R_{dyn}$ can be calculated based on the AC values of the current and voltage in the circuit 150. For example, the voltage at node A can be measured and, it has been found that this is different from $V_s$—we call this voltage $V_{AC}$. $V_{AC}$ can be measured practically by any suitable means, but is the AC voltage within the parallel LC loop. Using this, one can determine an AC current, $I_{AC}$, by equating the AC and DC power. That is, $V_{AC}I_{AC}=V_SI_S$. The parameters $V_s$ and $I_s$ can be substituted with their AC equivalents in Equation 5, or any other suitable equation for the parameter r. It should be appreciated that a different set of calibration curves may be realized in this case.

While the above description has described the operation of the temperature measurement concept in the context of the circuit 150 which is configured to self-drive at the resonant frequency, the above described concepts are also applicable to an induction heating circuit which is not configured to be driven at the resonant frequency. For example, the above described method of determining the temperature of a susceptor may be employed with an induction heating circuit which is driven at a predetermined frequency, which may not be the resonant frequency of the circuit. In one such example, the induction heating circuit may be driven via an H-Bridge, comprising a switching mechanism such as a plurality of MOSFETs. The H-Bridge may be controlled, via a microcontroller or the like to use a DC voltage to supply an alternating current to the inductor coil at a switching frequency of the H-Bridge, set by the microcontroller. In such an example, the above relations set out in equations (1) to (5) are assumed to hold and provide a valid, e.g. usable, estimate of the temperature T for frequencies in a range of frequencies including the resonant frequency. In an example, the above described method may be used to obtain a calibration between the parameter r and the temperature T at the resonant frequency and the same calibration then used to relate r and T when the circuit is not driven at resonance. However, it should be appreciated that the derivation of Equation 5 assumes that the circuit 150 operates at a resonant frequency $f_0$. Therefore, it is likely that the error associated with the determined temperature increases with an increasing difference between the resonant frequency $f_0$ and the pre-determined drive frequency. In other words, a temperature measurement with a greater accuracy can be determined when the circuit is driven at, or close to, the resonant frequency. For example, the above method of relating and determining r and T may be used for frequencies within a range $f_0-\Delta f$ to $f_0+\Delta f$, where $\Delta f$ may, for example, be determined experimentally by measuring the temperature of the susceptor T directly and testing the above derived relationships. For example, larger values of $\Delta f$ may provide lower accuracy in the determination of the temperature T of the susceptor, but may still be usable.

In some examples, the method may comprise assigning $V_s$ and $I_s$ constant values and assuming that these values do not change in calculating the parameter r. The voltage $V_s$ and the current $I_s$ may then need not be measured in order to estimate the temperature of the susceptor. For example, the voltage and current may be approximately known from the properties of the power source and the circuit and may be assumed to be constant over the range of temperatures used. In such examples, the temperature T may then be estimated by measuring only the frequency at which the circuit is operating, and using assumed or previously measured values for the voltage and current. The invention thus may provide for a method of determining the temperature of the susceptor by measuring the frequency of operation of the circuit. In some implementations, the invention thus may provide for a method of determining the temperature of the susceptor by only measuring the frequency of operation of the circuit.

The above examples are to be understood as illustrative examples of the invention. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. An apparatus for an aerosol generating device, the apparatus comprising:

an LC resonant circuit comprising an inductive element for inductively heating a susceptor arrangement to heat an aerosol generating material to thereby generate an aerosol;

a switching arrangement for enabling a varying current to be generated from a DC voltage supply and flow through the inductive element to cause inductive heating of the susceptor arrangement; and a temperature determiner for, in use, determining a temperature of the susceptor arrangement based on a frequency that the LC resonant circuit is being operated at.

2. The apparatus according to claim 1, wherein the temperature determiner is for, in use, determining a temperature of the susceptor arrangement based on, in addition to the frequency that the LC resonant circuit is being operated at, a DC current from the DC voltage supply.

3. The apparatus according to claim 2, wherein the temperature determiner is for, in use, determining a temperature of the susceptor arrangement based on, in addition to the frequency that the LC resonant circuit is being operated at and the DC current from the DC voltage supply, a DC voltage of the DC voltage supply.

4. The apparatus according to claim 3, wherein the temperature determiner determines an effective grouped resistance of the inductive element and the susceptor arrangement from the frequency that the LC resonant circuit is being operated at, the DC current from the DC voltage supply and the DC voltage of the DC voltage supply, and determines the temperature of the susceptor arrangement based on the determined effective grouped resistance.

5. The apparatus according to claim 4, wherein the temperature determiner determines the temperature of the susceptor arrangement from a calibration of values of the effective grouped resistance of the inductive element and the susceptor arrangement and the temperature of the susceptor arrangement.

6. The apparatus according to claim 5, wherein the calibration is based on a polynomial equation.

7. The apparatus according to claim 5, wherein the calibration of values between the effective grouped resistance and the temperature of the susceptor arrangement is one of a plurality of calibrations between the effective grouped resistance and the temperature of the susceptor arrangement, and wherein the temperature determiner is configured to select one of the plurality of calibrations to use in determining the temperature of the susceptor from values of the effective grouped resistance.

8. The apparatus according to claim 7, further comprising a temperature sensor configured to detect a temperature associated with the susceptor arrangement prior to heating by the inductive element, wherein the temperature determiner uses the temperature detected by the temperature sensor to select the calibration.

9. The apparatus according to claim 8, wherein the temperature measured by the temperature sensor is a temperature ambient to the aerosol generating device.

10. The apparatus according to claim 8, wherein the aerosol provision device comprises a chamber to receive the susceptor arrangement, and the temperature measured by the temperature sensor is a temperature of the chamber.

11. The apparatus according to claim 8, wherein the temperature determiner is configured to:

determine a value of the effective grouped resistance corresponding to the temperature detected by the temperature sensor, and select the calibration from the plurality of calibrations based on a comparison between the temperature detected by the temperature sensor and the temperature given by each of the plurality of calibrations using the value of the effective grouped resistance corresponding to the temperature detected by the temperature sensor.

12. The apparatus according to claim 7, wherein each calibration is a calibration curve, a polynomial equation, or a set of calibration values in a look-up table.

13. The apparatus according to claim 7, wherein the temperature determiner is configured to perform the selection of a calibration each time the aerosol generating device is powered on, or each time the aerosol generating device enters into an aerosol generating mode.

14. The apparatus according to claim 4, wherein the temperature determiner determines the effective grouped resistance r using the formula $$r = \frac{I_s}{V_s} \frac{1}{(2\pi f_0 C)^2}$$

where $V_s$ is the DC voltage and $I_s$ is the DC current, C is a capacitance of the LC resonant circuit, and $f_0$ is the frequency that the LC resonant circuit is being operated at.

15. The apparatus according to claim 1, wherein the LC circuit is a parallel LC circuit comprising a capacitive element arranged in parallel with the inductive element.

16. The apparatus according to claim 1, wherein the frequency that the LC resonant circuit is being operated at is a resonant frequency of the LC resonant circuit.

17. The apparatus according to claim 1, wherein the switching arrangement is configured to switch between a first state and a second state, and wherein the frequency at which the LC circuit is being operated is determined from a determination of a frequency at which the switching arrangement switches between the first state and the second state.

18. The apparatus according to claim 17, wherein the switching arrangement comprises one or more transistors, and wherein the frequency at which the LC circuit is being operated is determined by measuring a period at which one of the one or more transistors switches between an on state and an off state.

19. The apparatus according to claim 17, wherein the switching arrangement is configured to alternate between the first state and the second state in response to voltage oscillations within the resonant circuit which operate at a resonant frequency of the resonant circuit, whereby the varying current is maintained at the resonant frequency of the resonant circuit.

20. The apparatus according to claim 19, wherein the switching arrangement comprises a first transistor and a second transistor, and wherein, when the switching arrangement is in the first state the first transistor is OFF and the second transistor is ON and when the switching arrangement is in the second state the first transistor is ON and the second transistor is OFF.

21. The apparatus according to claim 20, wherein the first transistor and the second transistor each comprises a first terminal for turning that respective transistor ON and OFF, a second terminal and a third terminal, and wherein the switching arrangement is configured such that first transistor is adapted to switch from ON to OFF when the voltage at the second terminal of the second transistor is equal to or below a switching threshold voltage of the first transistor.

22. The apparatus according to claim 20, wherein the first transistor and the second transistor each comprises a first terminal for turning that respective transistor ON and OFF, a second terminal and a third terminal, and wherein the switching arrangement is configured such that second transistor is adapted to switch from ON to OFF when the voltage at the second terminal of the first transistor is equal to or below a switching threshold voltage of the second transistor.

23. The apparatus according to claim 20, wherein the resonant circuit further comprises a first diode and a second diode, and wherein the first terminal of the first transistor is connected to the second terminal of the second transistor via the first diode, and the first terminal of the second transistor is connected to the second terminal of the first transistor via the second diode, whereby the first terminal of the first transistor is clamped at a low voltage when the second transistor is ON and the first terminal of the second transistor is clamped at a low voltage when the first transistor is ON.

24. The apparatus according to claim 23, wherein the switching arrangement is configured such that the first transistor is adapted to switch from ON to OFF when a voltage at the second terminal of the second transistor is equal to or below a switching threshold voltage of the first transistor plus a bias voltage of the first diode.

25. The apparatus according to claim 23, wherein the switching arrangement is configured such that the second transistor is adapted to switch from ON to OFF when a voltage at the second terminal of the first transistor is equal to or below a switching threshold voltage of the second transistor plus a bias voltage of the second diode.

26. The apparatus according to claim 1, further comprising a frequency to voltage converter configured to output a voltage value indicative of the frequency at which the LC circuit is being operated.

27. The apparatus according to claim 1, wherein at least one of the DC voltage or and/or the DC current are estimated values.

28. The apparatus according to claim 1, wherein values obtained for at least one of the DC voltage or DC current are values measured by the apparatus.

29. The apparatus according to claim 1, wherein a first terminal of the DC voltage supply is connected to a first point and a second point in the resonant circuit and wherein the first point and the second point are electrically located on either side of the inductive element.

30. The apparatus according to claim 1, further comprising at least one choke inductor positioned between the DC voltage supply and the inductive element.

31. An aerosol generating device comprising the apparatus according to claim 1.

* * * * *